Feb. 15, 1927.                                              1,617,466
O. TRONSTAD
FLOAT FOR BATH SOAPS
Filed March 4, 1926

Inventor
Ole Tronstad
Attorneys

Patented Feb. 15, 1927.

1,617,466

UNITED STATES PATENT OFFICE.

OLE TRONSTAD, OF EAU CLAIRE, WISCONSIN.

FLOAT FOR BATH SOAPS.

Application filed March 4, 1926. Serial No. 92,377.

The present invention relates to a novel means of affording buoyancy to non-floating cakes of soap, and the primary object of the invention resides in the provision of a novel type of float which may be readily associated with cakes of non-floating bath soaps, in a manner for affording sufficient buoyancy to the soap to cause the same to float upon the surface of the water in which the cake is placed.

A further object of the invention resides in the provision of a novel buoyant means for non-floating cakes of soap; which when associated with the soap, not only affords means for keeping the cake afloat, but also serves as a suitable handle for ready gripping and using of the soap.

A still further object of the invention resides in the provision of a novel float for non-floating cakes of soap; which may be economically manufactured and thus retailed at a relatively low price, and which float is of such formation that when pressed into the cake of soap, a sufficient amount of air will be entrapped in the float and serve for buoying up the cake when placed in the water.

Other objects and advantages of the invention will be apparent during the course of the following detail description, taken in connection with the accompanying drawing forming a part of this specification and in which drawing.

Figure 1:
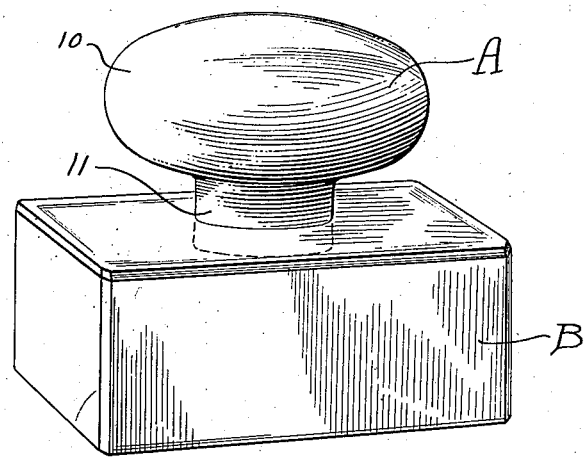
Figure 1 is a perspective view showing the improved float applied to a cake of soap.

In the drawing, the letter A designates the improved float, and B a cake of soap of any desired configuration and preferably but not necessarily of a specific gravity such that when placed in water will not of itself float upon the surface of the water.

Figure 2:
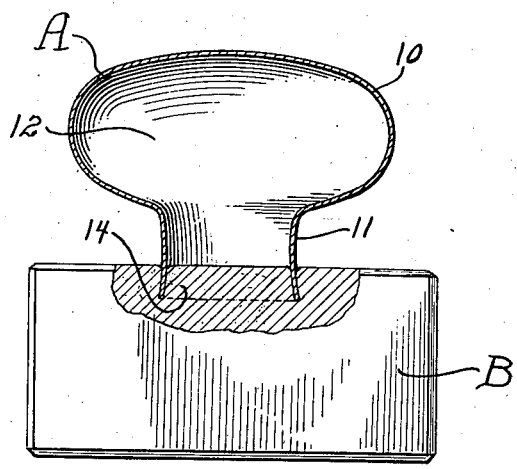
Figure 2 is a view partly in plan and part in central vertical section and showing the float secured to the cake of soap.
Figure 3:
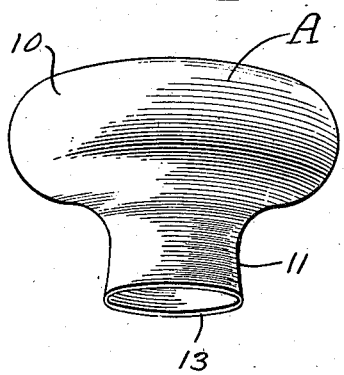
Figure 3 is a perspective view of the improved float before application of the same to a cake of soap.

The float A which is preferably formed of aluminum or any other light material, is of hollow formation and embodies a ball like head portion 10 which is preferably of spheroidal formation, and an axially disposed hollow stem or neck portion 11. The substantially ball like head portion 10, which may also be suitably termed a handle portion, provides a relatively large air chamber 12 in which a sufficient amount of air may be entrapped or imprisoned for affording sufficient buoyancy to the cake of soap B, should the cake be of a specific gravity such that when placed in water will not of itself float upon the surface of the water. The hollow stem portion 11 which merges into the lower portion of the head 10, preferably flares outwardly toward its open end 13 as clearly illustrated in Figures 2 and 3. By so having the hollow stem portion 11 flaring toward its open end 13, it will be seen that when the stem is pressed into the cake of soap as in Figure 2, that the flaring portion of the neck will create a wedging action which will prevent too ready removal of the float from the soap.

It will be readily apparent that when the stem 11 is pressed into the cake of soap, that the ball like handle portion will be spaced slightly from the upper surface of the soap for permitting of ready and easy grasping of the handle portion, and that when pressed into the soap the air entrapped in the chamber 12 will be partially compressed by reason of the amount of soap 14 which is forced upwardly into the open end of the stem portion.

It will be apparent that the area of the air chamber 12 will vary in accordance with the size of the cake of soap to be floated, especially if the soap is of that nature such that when placed in water will not of itself float upon the surface of the water. When the float is applied to such characters of soap as aforementioned, the float will of course always remain uppermost and thus allow for ready gripping of the head portion when the soap is floated upon the surface of the water.

If desirable, advertising matter may be placed on the ball like head portion 10, or the same may be ornamented in any preferred manner.

From the foregoing description it will be apparent that a novel float for cakes of soap has been provided, which may be readily and easily attached and detached from the cake of soap, and which when attached to the cake of soap, serves the dual function of acting as a float, should the cake of soap be of such character that when placed in water will not of itself float upon the surface of the water, and also as a suitable handle for the cake of soap.

Changes in detail may be made to the specific form of the invention herein shown and described, without departing from the spirit of the invention or the scope of the following claims.

I claim:

1. A float for soap cakes, comprising a ball like head portion providing an air chamber, and a hollow stem portion communicating with the air chamber and adapted when pressed into a soap cake to form a seal for the air chamber.

2. A float for soap cakes, comprising a hollow head portion providing an air chamber, and a hollow flaring stem portion adapted when pressed into a soap cake to provide a seal for the air chamber in the head portion.

3. A float for soap cakes, comprising a hollow head portion of spheroidal formation and providing an air chamber, and a hollow stem portion extending axially from the head portion adapted to be pressed into the soap cake with the portion of the soap cake within the stem serving as a seal for the air chamber of the head portion.

OLE TRONSTAD.